(12) United States Patent
Ryan et al.

(10) Patent No.: US 8,874,099 B2
(45) Date of Patent: Oct. 28, 2014

(54) METHOD AND APPARATUS FOR MEASURING MULTI-CELL DATA EFFICIENCY IN LINK ADAPTIVE WIRELESS NETWORKS

(71) Applicant: Eden Rock Communications, LLC, Bothell, WA (US)

(72) Inventors: David James Ryan, Seattle, WA (US); Jeffrey Paul Harrang, Sammamish, WA (US); Eamonn Gormley, Bothell, WA (US); Chaz Immendorf, Bothell, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 81 days.

(21) Appl. No.: 13/758,835

(22) Filed: Feb. 4, 2013

(65) Prior Publication Data
US 2013/0203401 A1    Aug. 8, 2013

Related U.S. Application Data

(60) Provisional application No. 61/594,895, filed on Feb. 3, 2012, provisional application No. 61/659,895, filed on Jun. 14, 2012.

(51) Int. Cl.
*H04W 4/00* (2009.01)
*H04W 24/08* (2009.01)
*H04W 24/02* (2009.01)

(52) U.S. Cl.
CPC .............. *H04W 24/02* (2013.01); *H04W 24/08* (2013.01)
USPC ....................................................... 455/422.1

(58) Field of Classification Search
USPC .............. 455/422.1, 423–425, 418–420, 453, 455/450, 524
See application file for complete search history.

(56) References Cited

U.S. PATENT DOCUMENTS

| 8,144,797 B2* | 3/2012 | Mujtaba et al. ................ 375/267 |
| 8,145,207 B2* | 3/2012 | Hwang et al. ................. 455/423 |
| 2008/0227401 A1 | 9/2008 | Scherzer et al. |
| 2009/0161613 A1* | 6/2009 | Kent et al. ...................... 370/329 |
| 2009/0285109 A1 | 11/2009 | Chin et al. |
| 2010/0041425 A1 | 2/2010 | Cesar et al. |
| 2011/0287775 A1 | 11/2011 | Fan et al. |

FOREIGN PATENT DOCUMENTS

KR    10-2009-0029910 A    3/2009

OTHER PUBLICATIONS

International Preliminary Report On Patentablilty for PCT/US2013-024665 dated Aug. 5, 2014.

* cited by examiner

*Primary Examiner* — Brandon Miller

(57) ABSTRACT

Network performance related to the evaluation of an interference reduction scheme may include measuring a signal strength value for a signal sent by at least one base station and received by a plurality of user equipment, calculating first signal strength ratios using the first signal strength value, converting the first signal strength ratio into first user equipment spectral efficiency values for each user equipment of the plurality of user equipment, and comparing the first spectral efficiency value to a second spectral efficiency value to evaluate a data efficiency metric associated with an interference reduction scheme that is running on the base station when the signal strength value is measured.

20 Claims, 10 Drawing Sheets

METHOD AND APPARATUS FOR MEASURING MULTI-CELL DATA EFFICIENCY IN LINK ADAPTIVE WIRELESS NETWORKS

CROSS-REFERENCES TO RELATED APPLICATIONS

The present invention claims priority to U.S. Provisional Application No. 61/594,895, filed Feb. 3, 2012, and U.S. Provisional No. 61/659,895, filed Jun. 14, 2012, both of which are incorporated by reference herein for all purposes.

BACKGROUND OF THE INVENTION

Cellular wireless networks include a large number of individual base stations or cells that provide high capacity wireless services over large coverage areas such as cities, surrounding residential areas, highway corridors and rural areas. Maximizing the capacity of such networks while utilizing a limited licensed radio frequency spectrum mandates a reuse of time and frequency channel resources throughout the cells in the network.

Third and fourth generation commercial wireless network technologies (3G and 4G) maximize system performance via high levels of time, coding and frequency channel reuse, whereby most if not all cells in a network are provisioned to utilize the same radio frequency spectrum. This can lead to high levels of interference and poor performance particularly for users operating at the overlapping boundary regions between neighboring cells. Because of the high levels of interference, network performance is substantially degraded when compared to a case where there is no interference.

Interference reduction techniques have been developed that can reduce the levels of interference throughout the network. Some examples of these interference reduction techniques include Fractional Frequency Reuse (FFR), Inter Cell Interference Coordination (ICIC) and Coordinated Power Scheduling. Operators that plan make use of one or more of these interference reduction techniques would like to be able to understand the performance benefits that these techniques provide to their networks.

There are several metrics that can be looked at before and after an interference reduction scheme has been deployed that can provide a measure of the performance benefits of the interference reduction schemes. Some examples of the metrics are network throughput, per-cell throughput, cell edge throughput, per-cell spectral efficiency, and cell edge spectral efficiency.

It can be useful to compare the performance of a network that utilizes an interference reduction scheme with a network in which no interference is present. This provides a measure of how well an interference reduction scheme performs against an ideal case in which no interference is present in the network and the radio links in the network are limited only by background thermal noise. Such a case would provide performance equivalent to each link operating on a different frequency to all near neighbor links.

The performance benefits of an interference reduction scheme could be measured by periodically disabling the interference reduction scheme globally across the network and making measurements of the performance without the interference reduction scheme enabled. However, network operators would usually prefer to not disrupt the operation of the network and instead be able to make a performance comparison without disabling the interference reduction scheme.

BRIEF SUMMARY OF THE INVENTION

Embodiments of the present invention relate to a system and methods that provide data efficiency metrics. The data efficiency metrics can be used to evaluate an interference reduction scheme while the interference reduction scheme is enabled. Methods are provided for estimating what the capacity of the network would be in the absence of interference. In an embodiment, these metrics can then be used in a Self Organizing Network (SON) to trigger SON actions and behaviors.

In an embodiment, a networked computer system in a cellular communications network comprises a processor, a memory, and a non-transitory computer readable medium with computer executable instructions stored thereon. When executed by the processor, the instructions perform the following process.

An aspect of the process is measuring a signal strength value for a signal sent by at least one base station and received by a plurality of user equipment, and calculating first signal strength ratios using the first signal strength value. The process further includes converting the first signal strength ratio into first user equipment spectral efficiency values for each user equipment of the plurality of user equipment, and comparing a first spectral efficiency value which corresponds to the first user equipment spectral efficiency values to a second spectral efficiency value to evaluate a data efficiency metric associated with an interference reduction scheme that is running on the base station when the signal strength value is measured.

In an embodiment, the process further includes calculating the first spectral efficiency value using a weighted average of the first user equipment spectral efficiency values for at least a portion of the plurality of user equipment, and the first spectral efficiency value and the second spectral efficiency value are average values.

In an embodiment, the process includes calculating second signal strength ratios using the signal strength value, converting the second signal strength ratios into user equipment interference-free spectral efficiency values for each user equipment of the plurality of user equipment, and calculating an average interference-free spectral efficiency value using a weighted average of the user equipment interference-free spectral efficiency ratios for at least a portion of the plurality of user equipment. The first spectral efficiency value may be a baseline spectral efficiency value, and the second spectral efficiency value may be the average interference-free spectral efficiency value.

In an embodiment, the first signal strength ratios are carrier to interference plus noise ratios (CINR), and the second signal strength ratios are signal to noise ratios (SNR).

An embodiment includes an actual spectral efficiency value. A process for determining a spectral efficiency value may include measuring throughput data, measuring spectral resource usage over the period of time, converting the spectral resource usage and the throughput into an actual spectral efficiency value for user equipment, and calculating an average actual spectral efficiency value from the actual spectral efficiency values for user equipment. In such a process, the second average spectral efficiency value is the average actual spectral efficiency value, and the first user equipment spectral efficiency values may be baseline spectral efficiency values or interference-free spectral efficiency values.

An embodiment may include determining a calibration function that is then used to calculate the user equipment spectral efficiency values.

In an embodiment, the weights applied to calculate the average interference-free spectral efficiency value are a function of the amount of traffic sent to the plurality of user equipment over a time period.

In an embodiment, calculating the first average spectral efficiency value further includes arranging the first user equipment spectral efficiency values in order, selecting a predetermined percentile of the arranged values that is less than fifty percent; and selecting a spectral efficiency value corresponding to the predetermined percentile. The selected spectral efficiency value may be the first spectral efficiency value.

In an embodiment, calculating the first average spectral efficiency value further includes calculating base station spectral efficiency values for each of a cluster of base stations, and calculating a cluster spectral efficiency value by averaging the base station spectral efficiency values. Aspects of the present invention may be practiced as a method, and encoded on a non-transitory computer readable medium.

DETAILED DESCRIPTION OF THE INVENTION

Embodiments of the present invention relate to quantifying the performance of interference management schemes, or interference reduction schemes, deployed across a cellular wireless communication network. Embodiments of the present invention may be practiced while the network is operating and the interference reduction scheme is enabled. In particular, embodiments include calculating spectral efficiency values and estimates for actual spectral efficiency, spectral efficiency in the absence of an interference reduction scheme, and spectral efficiency with no interference in the network. Spectral efficiency can be calculated for a single base station or a cluster of base stations. Spectral efficiency values can be compared to one another in order to determine network performance characteristics.

Figure 1:
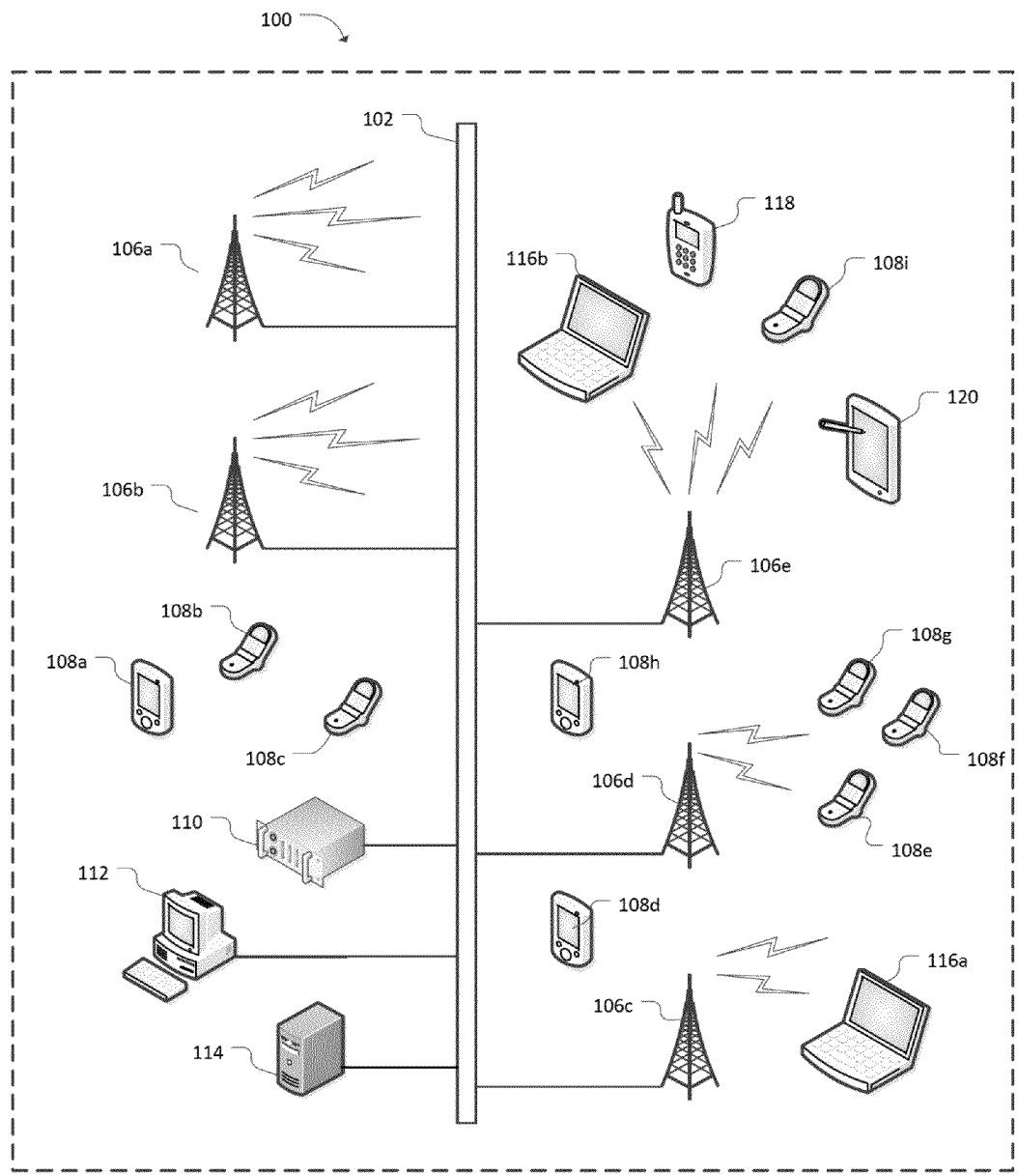
FIG. 1 illustrates a networked computing system according to embodiments of the present invention.

FIG. 1 illustrates an exemplary networked computing system 100 including various wired and wireless computing devices that may be utilized to implement processes associated with various embodiments of the present invention. These processes may include, but are not limited to network communications state determinations such as interference metric determinations, network resource monitoring, neighboring cell interference rankings, and signal strength evaluation.

A networked computing system 100 may include a group of service provider controller devices 110, 112, and 114, any of which may be Network Resource Controllers (NRCs) or have NRC functionality; network base stations 106a-e, any of which may be NRCs or have NRC functionality, that may share overlapping wireless coverage with one or more neighboring base stations within a particular region of the networked computing system 100; multiple user equipment (UE) including cell phone/PDA devices 108a-i, laptop/netbook computers 116a-b, handheld gaming units 118, electronic book devices or tablet PCs 120, and any other type of common portable wireless computing device that may be provided with wireless communications service by any of the network base stations 106a-e; and a data communications network 102, including a backhaul portion that can facilitate distributed network communications between any of the network controller devices 110, 112, and 114 and any of the network base stations 106a-e.

As would be understood by those skilled in the art, in most digital communications networks, the backhaul portion of a data communications network 102 includes intermediate links between a backbone of the network, which are generally wireline or fiber, and sub-networks or network base stations 106a-e located at the periphery of the network. For example, cellular equipment, such as any of user equipment 108a-i, 116a-b, 118, and 120, communicating with one or more network base stations 106a-e may constitute a local sub-network. The network connection between any of the network base stations 106a-e and the rest of the world may initiate with a link to the backhaul portion of an access provider's communications network 102 (e.g., via a point of presence).

A Network Resource Controller (NRC) is a physical entity that may include software components. An NRC may facilitate processes associated with various embodiments of the present invention. In accordance with an embodiment of the present invention, an NRC may be a physical device, such as a network controller device 110, 112, and 114 or a network base station 106a-e. In yet another embodiment, an NRC may be a logical software-based entity that can be stored in the volatile or non-volatile memory or memories, or more generally in a non-transitory computer readable medium, of a physical device such as a network controller device 110, 112, and 114, or a base station 106a-e.

In accordance with various embodiments of the present invention, the NRC has presence and functionality that may be defined by the processes it is capable of carrying out. Accordingly, the conceptual entity that is the NRC may be generally defined by its role in performing processes associated with the creation, storage, and use of spectral efficiency information. Therefore, depending on the particular embodiment, the NRC entity may be considered to be either a physical device, and/or a software component that is stored in the computer readable media such as volatile or non-volatile memories of one or more communicating device(s) within a networked computing system 100.

In an embodiment, any of the service provider controller devices 110, 112, and 114, and/or network base stations 106a-e (optionally having NRC functionality or considered to be a NRC) may function independently or collaboratively to implement processes associated with various embodiments of the present invention. Further, processes may be carried out via any common communications technology known in the art, such as those associated with modern Global Systems for Mobile (GSM), Universal Mobile Telecommunications System (UMTS), Long Term Evolution (LTE) network infrastructures, etc.

In accordance with a standard GSM network, any of the service provider controller devices 110, 112, and 114 (NRC devices or optionally having NRC functionality) may be associated with a base station controller (BSC), a mobile switching center (MSC), or any other common service provider control device known in the art, such as a radio resource manager (RRM). In accordance with a standard UMTS network, any of the service provider controller devices 110, 112, and 114 (optionally having NRC functionality) may be associated with a network resource controller (NRC), a serving GPRS support node (SGSN), or any other common service provider controller device known in the art, such as a radio resource manager (RRM) or operations and maintenance controller (OMC). In accordance with a standard LTE network, any of the service provider controller devices 110, 112, and 114 (optionally having NRC functionality) may be associated with an eNodeB base station, a mobility management entity (MME), or any other common service provider controller device known in the art, such as an RRM or OMC.

In an embodiment, any of the service provider controller devices 110, 112, and 114, the network base stations 106a-e, as well as any of the user equipment 108a-i, 116a-b, 118, and 120 may be configured to run any well-known operating system, including, but not limited to: Microsoft® Windows®, Mac OS®, Google® Chrome®, Linux®, Unix®, or any mobile operating system, including iOS® Symbian®, Palm®, Windows Mobile®, Google® Android®, Mobile Linux®, etc. In an embodiment, any of the service provider controller devices 110, 112, and 114, or any of the network base stations 106a-e may employ any number of common server, desktop, laptop, and personal computing devices.

In an embodiment, any of the user equipment 108a-i, 116a-b, 118, and 120 may be associated with any combination of common mobile computing devices (e.g., laptop computers, netbook computers, tablet computers, cellular phones, PDAs, handheld gaming units, electronic book devices, personal music players, MiFi™ devices, video recorders, etc.) having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and powerline cable, along with any other wireless communication technology known in the art. In an embodiment, any of the service provider controller devices 110, 112, and 114, the network base stations 106a-e, and user equipment 108a-i, 116a-b, 118, and 120 may include any standard computing software and hardware necessary for processing, storing, and communicating data between each other within the networked computing system 100. The computing hardware realized by any of the network computing system 100 devices (e.g., any of devices 106a-e, 108a-i, 110, 112, 114, 116a-b, 118, and 120) may include: one or more processors, volatile and non-volatile memories, user interfaces, transcoders, modems, wireline and/or wireless communications transceivers, etc.

Further, any of the networked computing system 100 devices (e.g., any of devices 106a-e, 108a-i, 110, 112, 114, 116a-b, 118, and 120) may include one or more computer readable media encoded with a set of computer readable instructions which, when executed, can perform all or a portion of processes associated with embodiments of the present invention. In context with various embodiments of the present invention, it should be understood that wireless communications coverage associated with various data communication technologies (e.g., network base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
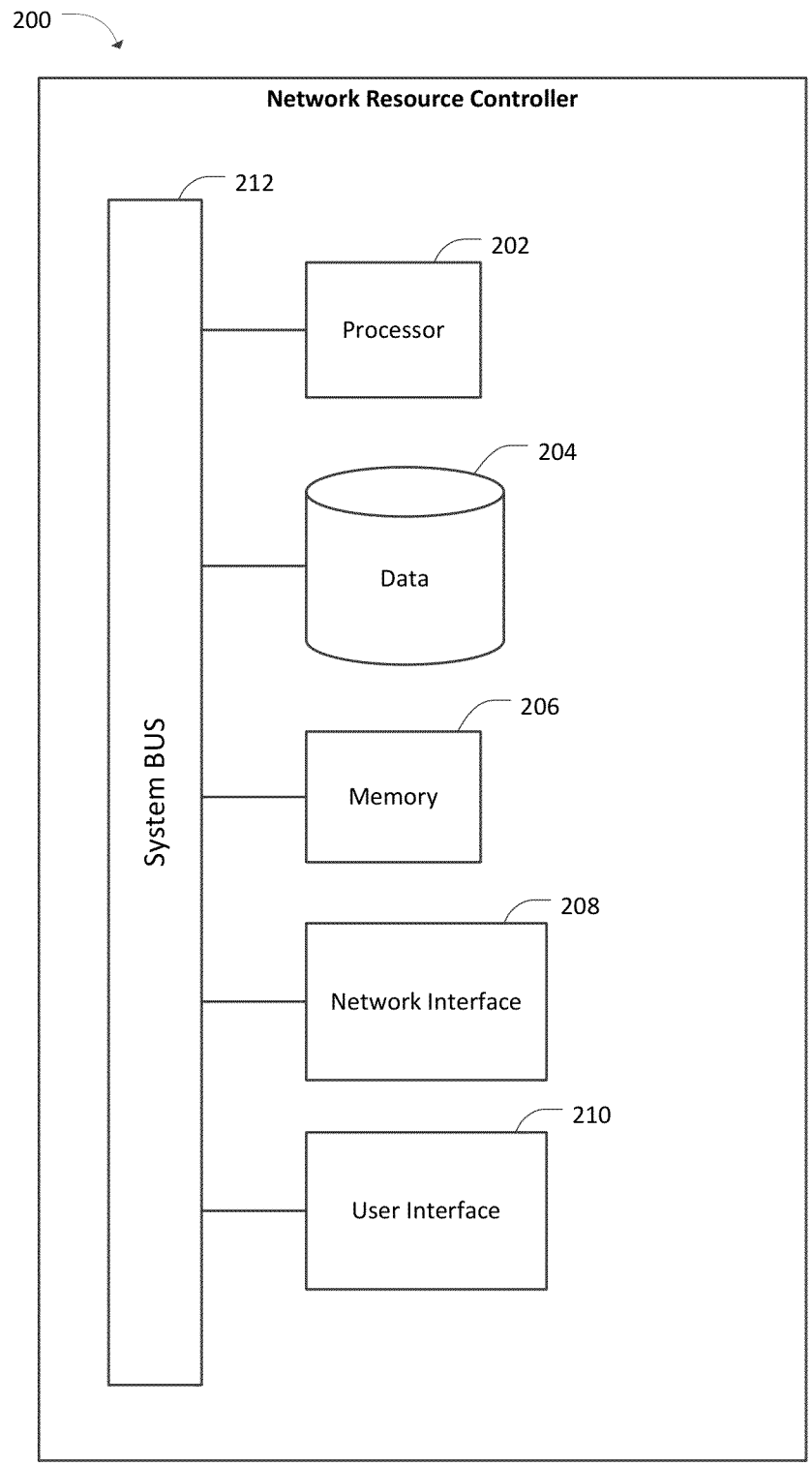
FIG. 2 illustrates a network resource controller according to embodiments of the present invention.

FIG. 2 illustrates a block diagram view of an NRC 200 that may be representative of any of the network base stations 106a-e or any of the network controller devices 110, 112, and 114 depicted in FIG. 1. In accordance with an embodiment of the present invention, the NRC 200 may be associated with any common base station or network controller device known in the Art, such as an eNodeB (optionally comprising a wireless modem), RRM, MME, RNC, SGSN, BSC, MSC, etc. The NRC 200 may include one or more processor 202, which may be a central processing unit (CPU). In an embodiment, the processor 202 may include an arithmetic logic unit (ALU) that performs arithmetic and logical operations and one or more control unit (CU) that extracts instructions and stored content from memory and then executes and/or processes them, calling on the ALU when necessary during program execution.

The processor 202 may be responsible for executing computer programs, which may be included in data 204. Data 204 may be stored in memory 206. Memory 206 may be any form of volatile or non-volatile memory, and generally includes both volatile (RAM) and non-volatile (e.g., ROM) memory. In various embodiments, data 204 is stored on an ASIC, flash memory such as a USB drive, an EPROM, a solid state or magnetic drive, or other types of optical, magnetic, or semiconductor non-volatile computer readable media. When memory 206 is RAM, data 204 may be temporarily loaded into the RAM to be accessed by processor 202.

The NRC 200 may also include a network interface component 208 that can facilitate the NRC's 200 communication with the backhaul 102 portion or the wireless portions of the network computing system 100 of FIG. 1, and may facilitate a user or network administrator accessing the NRC's 200 hardware and/or software resources. The network interface may be coupled to a base station 106 to extract information from or add information to the base station 106. In various embodiments, the network interface 208 may be a direct data coupling such as a universal serial bus (USB) connection, an RS-232 interface, or other interface for exchanging electronic information.

The NRC 200 may include a user interface 210, which in turn may include one or more display components configured to provide textual or graphic information to a user, and one or more user input device such as a mouse, touchpad, or keyboard, for inputting information into the NRC 200. User interface 210 may be configured to display state information of the NRC 200 or any component of the system 100. All of the components of the NRC 200 may be operatively connected through a system BUS 212.

In specific embodiments of the present invention, base station spectral efficiency information may be stored in memory 206. Program instructions for instructing processor 202 to execute one or more processes associated with embodiments of the present invention may be stored as data

204. In another embodiment, by way of example, program instructions may be stored on an optical disk or portable external USB drive that is not included in memory 206.

Figure 3:
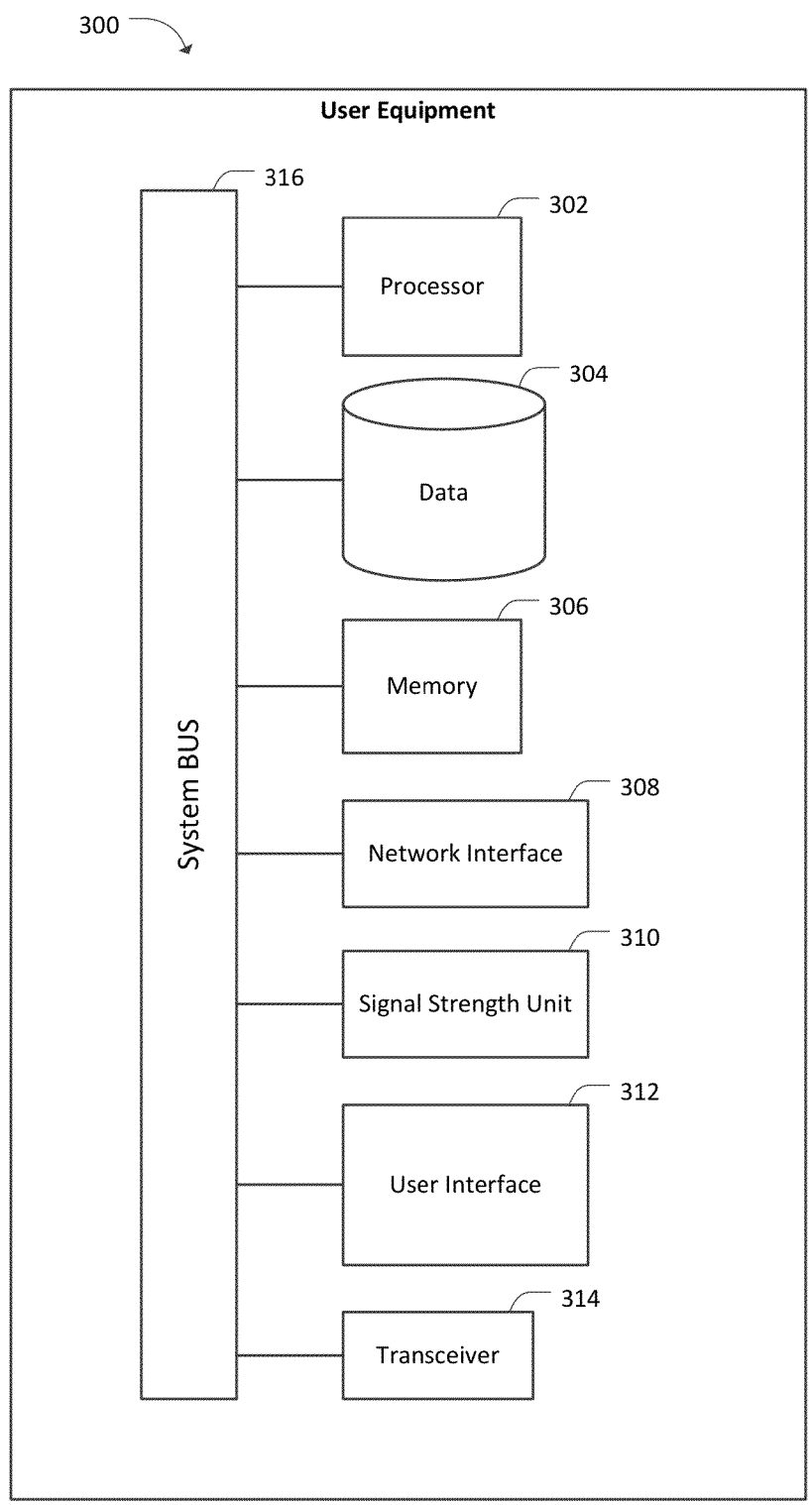
FIG. 3 illustrates user equipment according to embodiments of the present invention.

FIG. 3 illustrates a block diagram view of user equipment (UE) 300 which may in wireless communication with a base station. User equipment 300 may be any of user equipment 108a-i, 116a-b, 118, or 120, depicted in FIG. 1.

In accordance with an embodiment of the present invention, the user equipment 300 may include one or more processor 302. A processor may be a central processing unit (CPU) 302. In an embodiment, the processor 302 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The processor 302 may be responsible for executing all computer programs included in the data 304 of the user equipment 300.

The user equipment 300 may also include memory 306, a network interface 308, a user interface 310, and a system bus 316. These components are similar to the corresponding components in the network resource controller 200, and therefore a detailed description thereof is not provided. User equipment 300 is generally configured to exchange information with a base station through transceiver 314 according to one or more wireless communication technology.

User equipment 300 includes data 304, which may be stored on a non-transitory computer readable medium, and the medium may be included in or separate from memory 306. Data may include computer executable instructions which, when executed by processor 302, perform one or more process associated with embodiments of the present invention. In specific embodiments, data 304 may include RSRP, RSCP or Ec/Io values and interference information, which may in turn be transmitted to a base station and/or an NRC.

Figure 4:
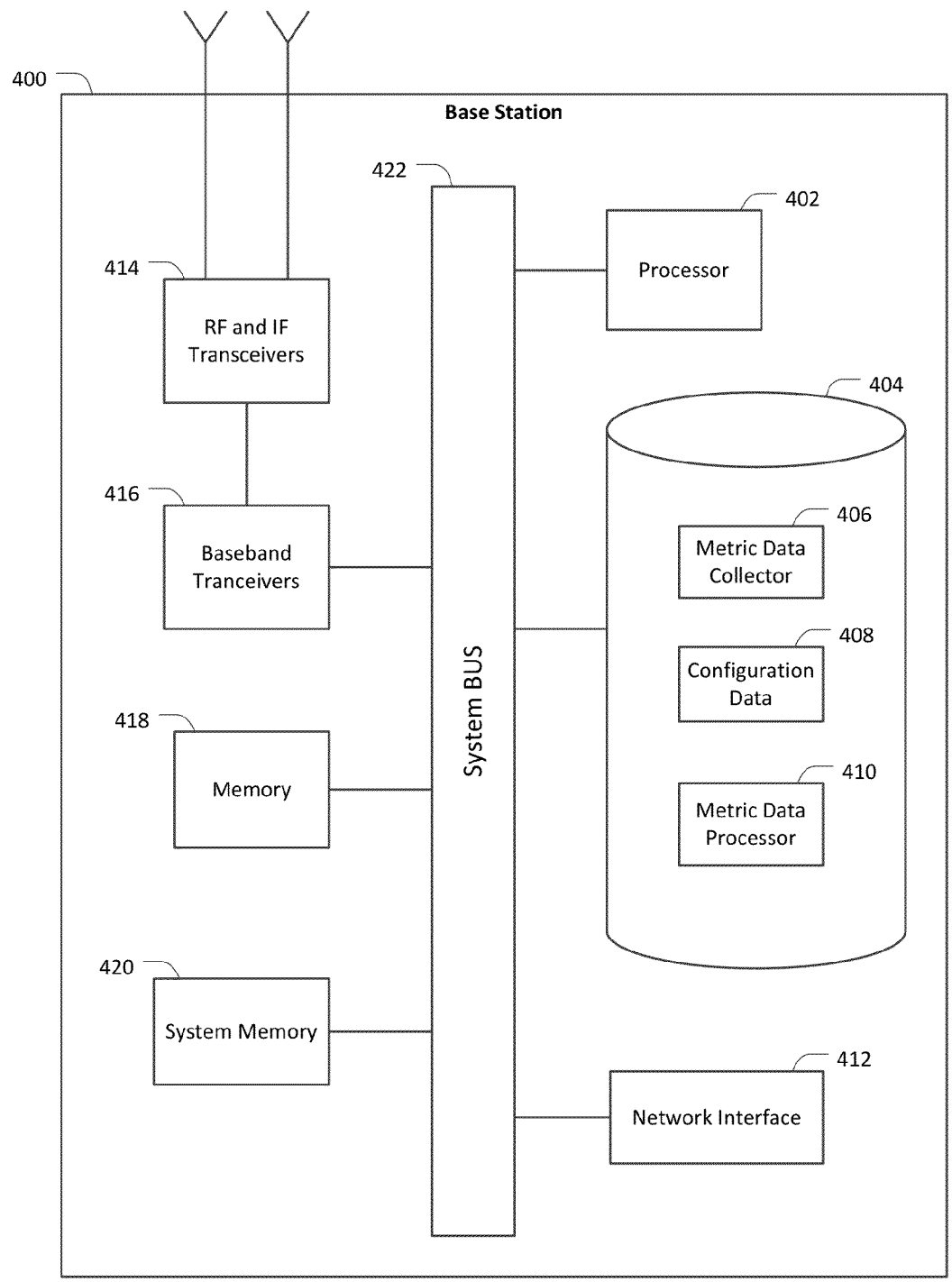
FIG. 4 illustrates a base station according to embodiments of the present invention.

FIG. 4 shows a block diagram of a base station 400 that may implement various aspects of the present invention. The base station includes RF and optional IF transceivers 414 and baseband transceivers 416 for sending and receiving data to/from mobile devices via one or more RF antennas. The base station also contains one or more processor 402, system memory 418, and network interface 412 for communicating over the backhaul network. The base station 400 also contains a software and data repository 404 that contains a metric data collector 406, a metric data processor 410, and base station configuration data 408.

In an embodiment, the metric data collector 406 gathers data from each active user equipment (UE) communicating with the base station 400. Data gathered by the metric data collector 406 may include one or more of the following:

1) The amount of data delivered over the most recent reporting interval, which may be expressed as bits of data.
2) A number of physical layer channel resources allocated to a user over the most recent reporting interval, such as the number of CDMA code channels, OFDM Resource Blocks, time domain TTIs, etc.
3) The common channel signal quality and/or strength, such as pilot Ec/Io in a CDMA network and RSRP in an LTE network, of a serving cell.
4) Channel signal quality and/or strength, such as pilot Ec/Io in a CDMA network and RSRP in an LTE network, for each observed neighbor cell.
5) UE noise power, which may be estimated as: UE Noise Power=thermal noise+$UE_{NoiseFigure}$, where thermal noise=−174 dBm/Hz and $UE_{NoiseFigure}$ can be assumed to be constant for a particular mobile device model, typically in the range 6 dB to 8 dB.
6) The average amount of base station transmit power allocated for transmissions to a UE which may be expressed in units of dBm (power referenced to 1 milli-Watt)

The metric data processor 410 may processes the metric data collected by the metric data collector 406. While the metric data collector 406 and metric data processor 410 are shown in the block diagram in FIG. 4, one or both of these entities could also reside on one of the core network servers shown in FIG. 5, such as the performance monitoring server or the SON server.

Much of the discussion of specific embodiments below assumes that the metric data collector 406 is collecting metrics from a LTE network. Persons of skill in the art will recognize that the processing steps for other network types (e.g., 3G HSPA networks) are similar, but they use data that is specific to the other networks. Embodiments of the present invention are not limited to a particular cellular communication technology.

Figure 5:
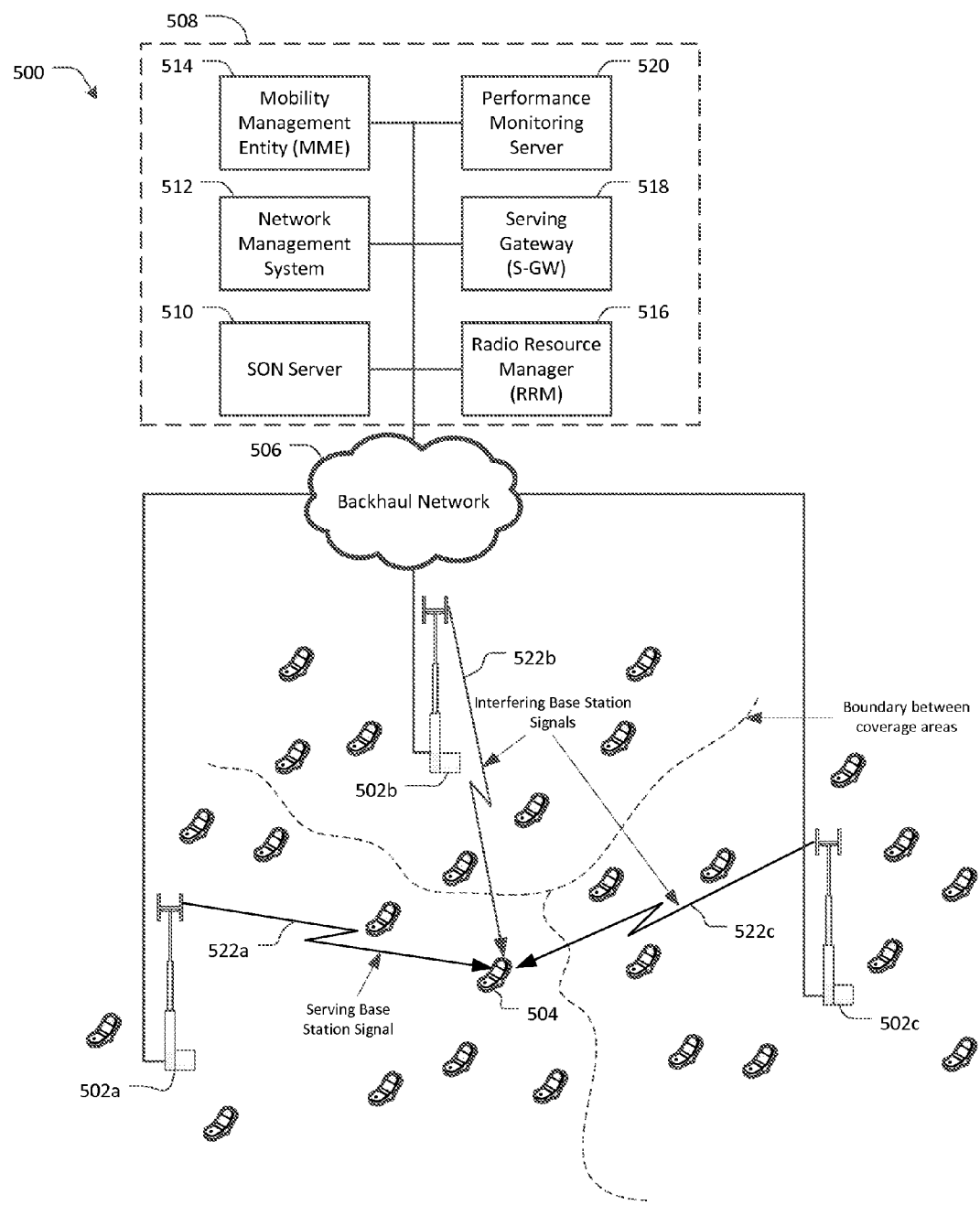
FIG. 5 illustrates a cellular network according to embodiments of the present invention.

FIG. 5 shows an example of a cellular network 500 including three base stations 502a-c, user equipment (UE) 504, a backhaul network 506 and core network equipment 508. The core network equipment 508 includes a SON Server 510, a Network Management System 512, a Mobility Management Entity 514, a Radio Resource Manager 516, a Serving Gateway 518, and a Performance Monitoring Server 520.

FIG. 5 also shows an example of a UE 504 receiving signals 522a-c from surrounding base stations 502a-c, respectively. Signal 522a is a signal from base station 502a which is serving the user equipment 504, while signals 522b and 522c from nearby base stations 502b and 502c are interfering with signal 522a.

Various aspects of the present invention may be implemented in equipment shown in FIG. 5. For example, spectral efficiency values for a base station may be calculated at the base station 502 to which the spectral efficiency value applies. Each of the base stations 502a-c in a base station cluster may then transmit their respective spectral efficiency estimates to SON server 518, which calculates a spectral efficiency estimate for the base station cluster. Thus, various operations may be performed by different network equipment. The scope of the present invention is not limited by the particular equipment performing each processing step.

Figure 6:
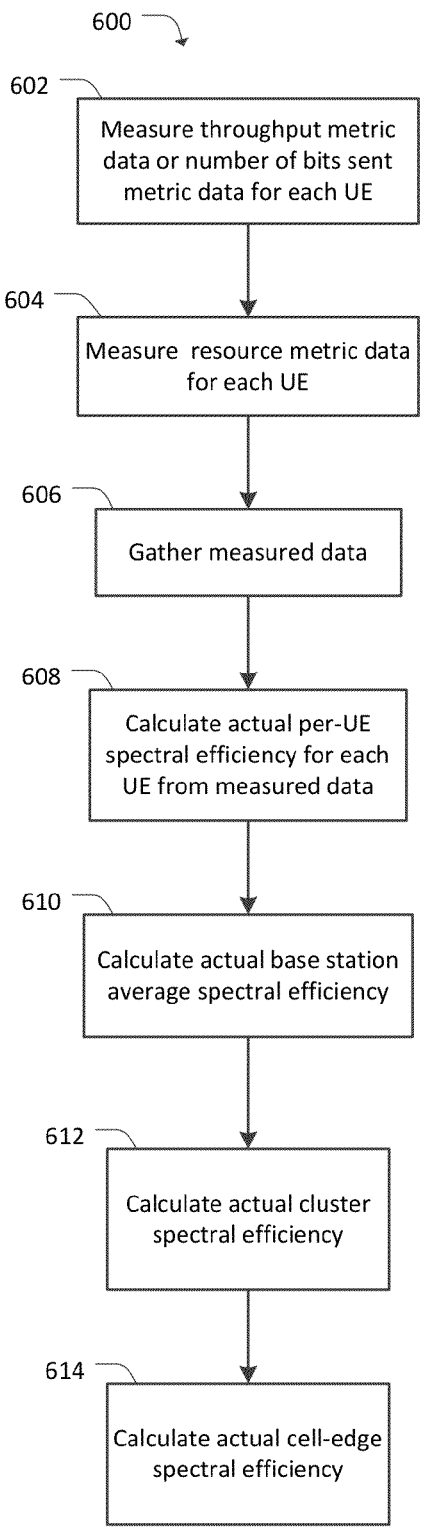
FIG. 6 illustrates a process of calculating actual network spectral efficiency according to embodiments of the present invention.

FIG. 6 shows a process 600 for calculating the actual spectral efficiency of a cluster of base stations according to an embodiment of the present invention. As used herein, the term "actual spectral efficiency" is a spectral efficiency value that is based on conditions while an interference reduction scheme is running on a network. The actual spectral efficiency is a measure of the performance of one or more network components with an interference reduction scheme enabled.

In step 602, throughput data is measured for each UE that is served by a particular base station. The throughput data may be the total number of bits received by a UE from a base station within a given time period. In step 604, resource metric data is measured for each UE that is served by a particular base station. The resource metric data may include a number of physical layer channel resources allocated to the UE over the most recent reporting interval, such as the number of CDMA code channels, OFDM Resource Blocks, time domain TTIs, etc.

In step 606, the measured resource metric data and the measured throughput data measured in step 602 are gathered by the base station, or another component of the network, such as an NRC or a SON server. In an embodiment that only evaluates performance of a single base station, all of the operations may be performed by the base station, in which case data is gathered by the base station. However, in an embodiment where an NRC performs a portion of the processes described herein, the NRC gathers data related to that portion. Gathering may include transferring data from a base station to another component of the network.

In step 608, the actual spectral efficiency is calculated on a per-UE basis for each UE served by the base station. The actual spectral efficiency can be calculated using the throughput data and the resource metric data gathered in step 606 according to conventional techniques. In step 610, the actual average spectral efficiency is calculated for a base station, for example by calculating an average of the spectral efficiencies calculated in step 608.

In step 612, the actual spectral efficiency for a cluster of base stations is calculated. The actual spectral efficiency for a cluster may be calculated by averaging actual base station spectral efficiency values that were calculated in step 610. The number of base stations included in the calculation can vary between different embodiments, and may be selectable by a user. In various embodiments, the size of the cluster can vary from as few as two base stations to as large as an entire network.

In step 614, the actual cell-edge spectral efficiency is calculated. The cell edge baseline spectral efficiency can be determined by sorting the UE baseline spectral efficiency values and selecting the $5^{th}$ or $10^{th}$ percentile value as the cell edge baseline spectral efficiency. Persons of skill in the art will recognize that other embodiments may use other percentile values. In another embodiment, the cell-edge spectral efficiency value may be an average value of all UE baseline spectral efficiency values less than and equal to the percentile value.

Figure 7:
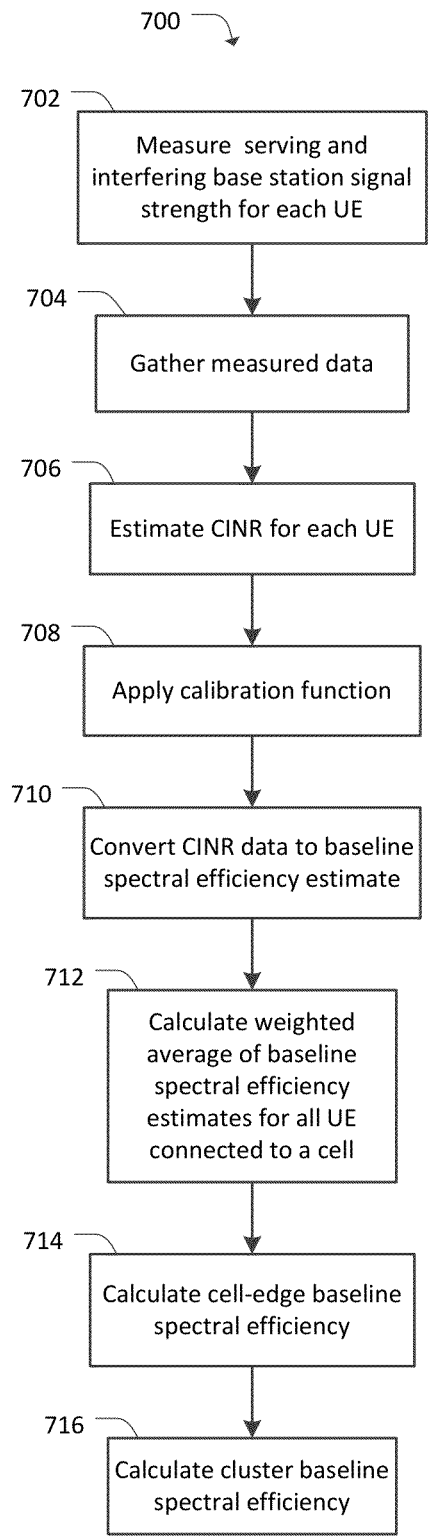
FIG. 7 illustrates a process of calculating baseline spectral efficiency according to embodiments of the present invention.
Figure 8:
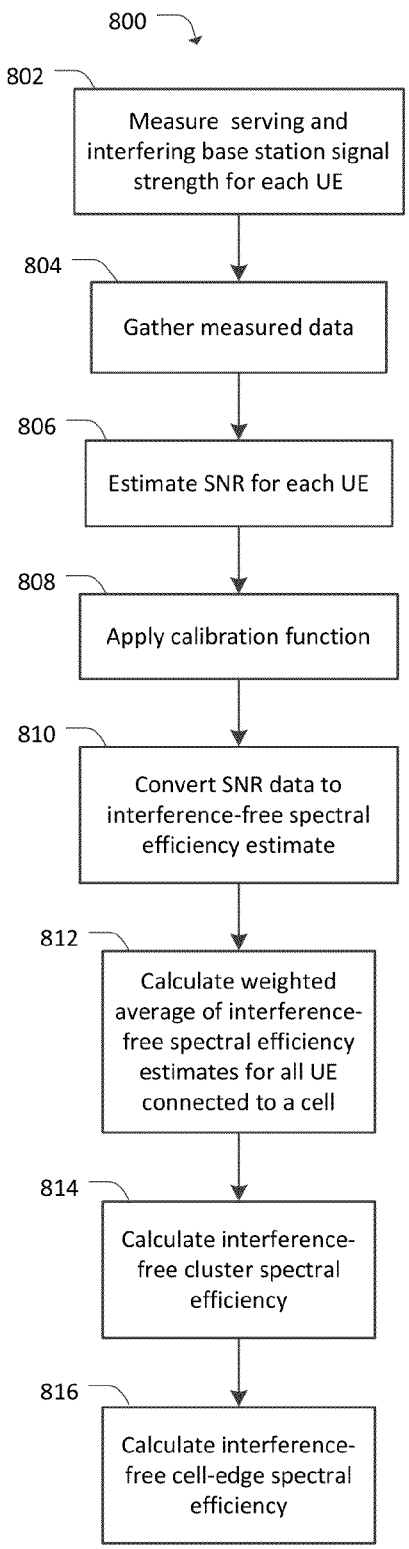
FIG. 8 illustrates a process of calculating interference-free spectral efficiency according to embodiments of the present invention.

Although process 600 discloses steps for calculating actual spectral efficiencies for UE, cell-edge, a base station, and a cluster, embodiments may calculate all of these values, or only one of the values. Thus, the processes described with respect to FIGS. 6-8 are representative of several possible processes performed by embodiments of the present invention, and are not limiting. In addition, embodiments of the present invention are not limited by the particular order in which the steps are performed.

FIG. 7 illustrates a process 700 for estimating spectral efficiency for performance in the absence of an interference reduction scheme, which may also be referred to as a baseline spectral efficiency, according to an embodiment of the present invention. The process 700 may begin with step 702 of measuring signal strengths for all of the UE that are served by a serving base station. In addition, step 702 includes measuring signal strength values between all of the UE served by the serving base station and all interfering base stations. An interfering base station may be a non-serving base station whose pilot signal is detected by a UE, or whose pilot signal strength is above a threshold value at the UE.

The signal strength measured in step 702 is the signal strength of a pilot signal sent by a base station. In an embodiment using LTE, the signal strength may be the reference signal received power (RSRP), and in a CDMA network, the signal strength may be the pilot signal received signal code power (RSCP). In other embodiments, the signal may be a similar signal that is transmitted by each base station.

In step 704, the measured signal strength data is gathered. The signal strength data may be gathered by receiving the data at the serving base station, and may additionally include transmitting the data from the serving base station to one or more component in a network system.

In step 706, a wideband Carrier to Interference plus Noise Ratio (CINR) is calculated on a per-UE basis. In an embodiment, the wideband CINR for mobile device i can be calculated for each UE according to the following equation 1:

$$CINR_i = \frac{RSRP_{ij}}{\sum_{k=1, k \neq j}^{N_{BS}} RSRP_{ik} + N_0} \quad \text{[Equation 1]}$$

In equation 1, $N_{BS}$ is the number of base stations from which the UE is receiving a signal, i is the UE index, j is the index of the serving base station, $1 \leq j \leq N_{BS}$, $RSRP_{ij}$ is the received signal power at mobile device i from the serving base station j expressed as a linear value (not in dB), $RSRP_{ik}$, $k \neq j$, is the received signal power at mobile device i from interfering base station k expressed as a linear value (not in dB), and $N_0$ is the thermal noise signal power level expressed as a linear value (not in dB).

In an embodiment, a weight that is proportional to the resources used is applied to the CINR as described in U.S. Provisional Application No. 61/659,895, which is incorporated herein by reference.

In an embodiment, a calibration function is applied to CINR data in step 708. Methods for determining the calibration function are discussed with respect to FIG. 9. Once the wideband CINR, has been calculated for a given UE, in step 710 it is converted into a baseline spectral efficiency value $\gamma_i$ via a lookup table, a CINR to spectral efficiency conversion formula, or some other process. In an embodiment, the calibration function may be applied when converting CINR data to a spectral baseline spectral efficiency estimate in step 710.

In step 712, an average baseline spectral efficiency is calculated for a base station. An average baseline spectral efficiency for a base station can be calculated as a weighted average of the spectral efficiencies of the active UE over a period of time. The weight applied to the UE baseline spectral efficiency in the averaging process may be a function of the amount of traffic sent to each device. The simplest function is where the weight equals the amount of traffic sent to each device.

The resultant instantaneous average baseline spectral efficiencies can be further averaged over a longer period of time to further reduce the time variance of the measurements and make more valid comparisons between the spectral efficiency calculated from the Wideband CINR measurements and the measured average baseline spectral efficiency when the interference reduction scheme is deployed.

Depending on the scheduling technique employed at the base station, the process used for calculating the weighted average baseline spectral efficiency can use a weighted arithmetic average, weighted geometric average, a weighted harmonic average, or a combination of each. For example, in an embodiment where a standard proportional fair scheduler is employed at the base station for scheduling data transmissions, the appropriate averaging technique to calculate the weighted average of the spectral efficiencies is weighted arithmetic averaging. However, if an equal throughput scheduler is used in an embodiment, then the weighted harmonic average of the spectral efficiencies may be used to provide the appropriate average spectral efficiency value.

In an embodiment, the formula for the weighted arithmetic average (mean) of N samples, $x_1, x_2, \ldots x_N$ and N weights, $w_1, w_2, \ldots w_N$ is expressed in the following equation 2:

$$\text{Weighted Arithmetic Mean} = \frac{\sum_{i=1}^{N} x_i w_i}{\sum_{i=1}^{N} w_i} \quad \text{[Equation 2]}$$

And the formula for the weighted harmonic average (mean) is expressed in the following equation 3:

$$\text{Weighted Harmonic Mean} = \frac{\sum_{i=1}^{N} w_i}{\sum_{i=1}^{N} \frac{w_i}{x_i}} \quad \text{[Equation 3]}$$

The resulting average baseline spectral efficiency calculated across a cell is effectively an estimate of the spectral efficiency that would be achieved for a single UE if no interference reduction scheme is enabled in the network.

In step 714, a baseline spectral efficiency is calculated for a cluster of base stations, which may include an entire network. The cluster baseline spectral efficiency can be calculated by averaging the baseline spectral efficiency values calculated in step 712 for all of the base stations in the network. In various embodiments, the averaging calculation may be performed using a weighted averaging function as described above. In an embodiment where each base station schedules data independently of the other base stations, the averaging type for calculating an average network spectral efficiency is arithmetic averaging.

In an embodiment, process 700 includes step 716 of calculating a cell-edge baseline spectral efficiency. The cell-edge baseline spectral efficiency may be calculated in a manner similar to calculating the actual baseline spectral efficiency, as explained above with respect to step 614.

FIG. 8 illustrates an embodiment of a process 800 for estimating values for spectral efficiency in a network in which no interference is present according to an embodiment of the present invention. The estimated value in a network in which no interference is present can also be referred to as an interference-free spectral efficiency, and it approximates performance of a noise limited system. Process 800 may begin with step 802 of measuring serving and interfering base station signal strength for each UE. Steps 802 and 804 may be performed in a similar fashion to steps 702 and 704 of process 700.

In step 806, a wideband Signal to Noise Ratio (SNR) is estimated for each UE attached to a particular base station using the data measured in step 804. The wideband SNR for $UE_i$ can also be calculated according to the following equation 4:

$$SNR_i = \frac{RSRP_{ij}}{N_0} \quad \text{[Equation 4]}$$

In equation 4, $RSRP_{ij}$ is the received signal from the serving base station j expressed as a linear value (not in dB), and $N_0$ is the thermal noise signal level expressed as a linear value (not in dB).

In an embodiment, a calibration function is applied to SNR data in step 708. Methods for determining the calibration function are discussed with respect to FIG. 9. Once the wideband $SNR_i$ has been calculated for a given $UE_i$, in step 808 the wideband $SNR_i$ can be converted into an interference-free spectral efficiency, $\gamma_i$. Step 808 of converting wideband $SNR_i$ into interference-free spectral efficiency $\gamma_i$ may be conducted via a lookup table, a CINR to spectral efficiency conversion formula, or some other process.

In step 812, an average interference-free spectral efficiency value is calculated for a base station. The interference-free spectral efficiency value may be calculated using a weighted average of the interference-free spectral efficiencies of active UE served by the base station within a predetermined time period. The process used for calculating an average interference-free spectral efficiency can use a weighted arithmetic average, weighted geometric average, or weighted harmonic average, or a combination of each, as described above with respect to step 712. Depending on the underlying technology used for transmitting data from a base station to the UE, the weight applied to the interference-free spectral efficiency in the averaging process can be a function of the amount of traffic sent to each device as explained in step 712.

In step 814, an interference-free spectral efficiency value is calculated for a base station cluster, or an entire network. The resulting value may be referred to as a cluster interference-free spectral efficiency value. The cluster interference-free spectral efficiency value may be calculated in a similar fashion to step 716, including using an arithmetic mean of a plurality of base station interference-free spectral efficiency values. In an embodiment, the averaging function is a weighted average.

In an embodiment, process 800 includes step 816 of calculating a cell-edge baseline spectral efficiency. The cell-edge baseline spectral efficiency may be calculated in a manner similar to calculating the actual baseline spectral efficiency, as explained above with respect to step 614.

The resulting base station and cluster interference-free spectral efficiency values calculated from the SNR data are good estimates of the spectral efficiency that would be achieved if there were no interference in the network. The interference-free spectral efficiency estimate represents a theoretical best case scenario, or the best performance that could be achieved from a perfect interference reduction scheme that could eliminate all interference in the network.

Figure 9:
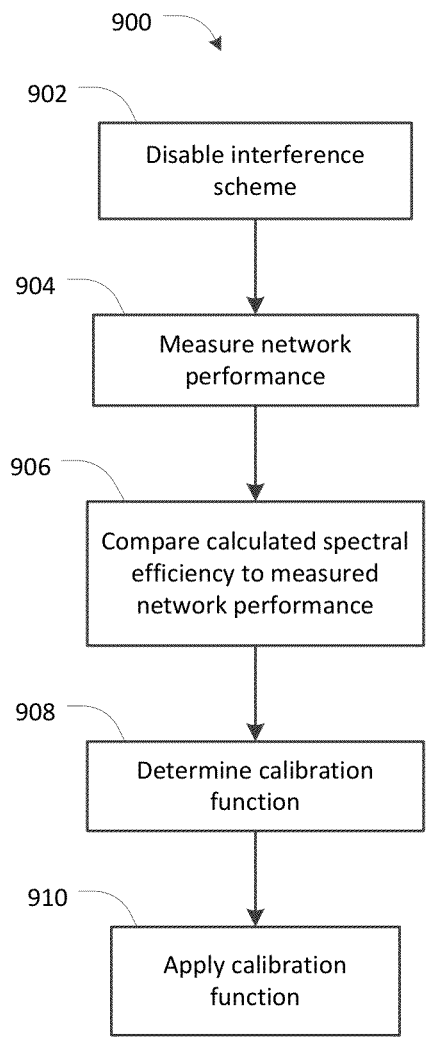
FIG. 9 illustrates a process of calibrating spectral efficiency estimates according to embodiments of the present invention.

FIG. 9 illustrates a process 900 for determining a calibration function according to an embodiment of the present invention. The calibration function determined by process 900 may be applied in step 708 or step 808 as discussed above. The following description describes determining a calibration function that can be applied when converting CINR data to baseline spectral efficiency. However, it is possible to apply calibration functions when converting SNR data to interference-free spectral efficiency as well.

In step 904, the interference reduction scheme running on the network is disabled for all or a portion of the network, and in step 906 network performance is measured without any interference reduction scheme. In an embodiment, network performance is measured for a single base station. In another embodiment, network performance may be additionally measured for a plurality of base stations.

In step 908, the measured network performance is compared to an estimated spectral efficiency value, and in step 910 a calibration function is determined which modifies the estimated spectral efficiency value to be more similar to the measured value. In step 912, the calibration function determined in step 910 can then be used to improve estimates of baseline UE spectral efficiency (step 608), as well as interference-free spectral efficiency (step 708).

In another embodiment, depending on the technology used, the average spectral efficiency can be calibrated by a function of the number of simultaneously active devices. For example, in OFDM systems, multi-user scheduling gains are achieved by the use of a frequency selective scheduler at the base station. The spectral efficiency achieved when, for example, 10 UE are simultaneously active, is usually greater than the average of the wideband spectral efficiencies of each individual UE. The actual calibration function for this case can be determined via simulation of the network, or via analysis of the measured spectral efficiency vs. the estimated spectral efficiency.

Figure 10:
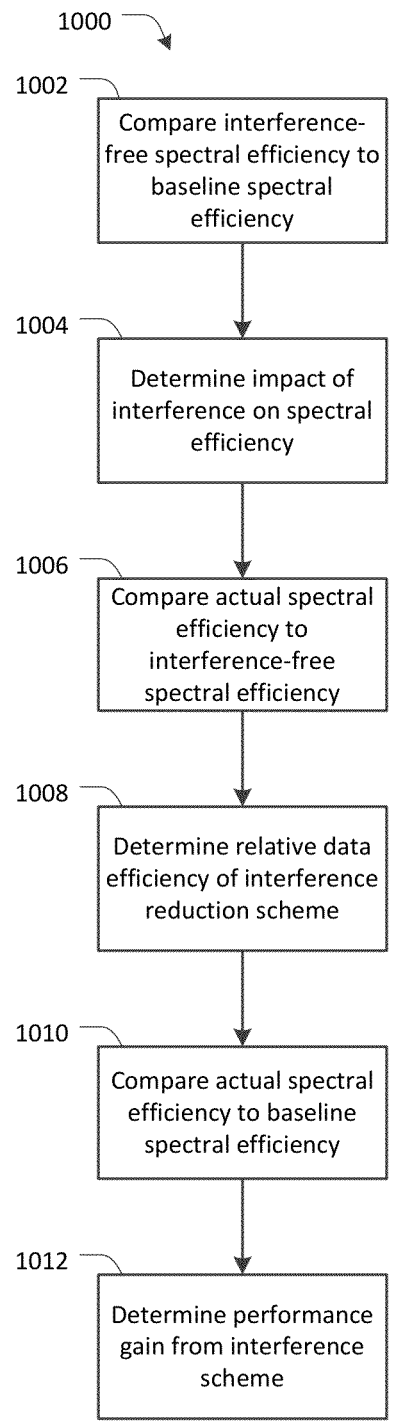
FIG. 10 illustrates a process of using spectral efficiency information according to embodiments of the present invention.

After spectral efficiency values have been calculated, the spectral efficiency values can be compared, and the results of the comparisons can be used to determine various aspects of the performance of the network and an interference reduction scheme. FIG. 10 illustrates a process for using the spectral efficiency information to determine various data efficiency metrics according to an embodiment of the present invention.

In step 1002, the interference-free spectral efficiency value is compared to the baseline spectral efficiency value. The ratio between the interference-free spectral efficiency value and the baseline spectral efficiency value provides an indication of the relative data efficiency of the network without an interference reduction scheme compared to an ideal case in which no interference is present. In step 1004, the ratio can be used, for example, to determine the total impact of interference on the spectral efficiency of one or more base stations.

In step 1006, the actual spectral efficiency value is compared to the interference-free spectral efficiency. The ratio between the actual spectral efficiency and the interference-free spectral efficiency provides an indication of the relative data efficiency of the interference reduction scheme compared to an ideal case in which no interference is present. In step 1008, the ratio from step 1006 can be used to determine the data efficiency of an interference reduction scheme relative to the theoretical maximum performance that could be achieved by a perfect interference reduction scheme.

In step 1010, the actual spectral efficiency is compared to the baseline spectral efficiency. The ratio between these values provides an indication of the performance gain of the system when the interference reduction scheme is enabled. In step 1012, the ratio can be used to determine the effect of the interference reduction scheme on network performance.

Although FIG. 10 shows three comparisons in series, various embodiments may include only one or two of the comparisons. In addition, although steps 1004, 1008, and 1012 describe specific determinations, persons of skill in the art will recognize that other information may be determined through comparing the various spectral efficiency values. In addition, as described above, the spectral efficiency values that are compared may be base station spectral efficiency values, cluster spectral efficiency values, cell edge spectral efficiency values, or a combination.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

What is claimed is:

1. A networked computer system in a cellular communications network comprising:
   a processor;
   a memory; and
   a non-transitory computer readable medium with computer executable instructions stored thereon which, when executed by the processor, perform the following method:
   measuring a signal strength value for a signal sent by at least one base station and received by a plurality of user equipment;
   calculating first signal strength ratios using the first signal strength value;
   converting the first signal strength ratio into first user equipment spectral efficiency values for each user equipment of the plurality of user equipment; and
   comparing a first spectral efficiency value corresponding to the first user equipment spectral efficiency values to a second spectral efficiency value to evaluate a data efficiency metric associated with an interference reduction scheme that is running on the base station when the signal strength value is measured.

2. The networked computer system of claim 1, wherein the non-transitory computer readable medium with computer executable instructions stored thereon further includes instructions which, when executed by the processor, further cause the processor to perform the following method:
   calculating the first spectral efficiency value using a weighted average of the first user equipment spectral efficiency values for at least a portion of the plurality of user equipment,
   wherein the first spectral efficiency value and the second spectral efficiency value are average values.

3. The networked computer system of claim 2, wherein the non-transitory computer readable medium with computer executable instructions stored thereon further includes instructions which, when executed by the processor, further cause the processor to perform the following method:
   calculating second signal strength ratios using the signal strength value;
   converting the second signal strength ratios into user equipment interference-free spectral efficiency values for each user equipment of the plurality of user equipment; and
   calculating an average interference-free spectral efficiency value using a weighted average of the user equipment interference-free spectral efficiency ratios for at least a portion of the plurality of user equipment,
   wherein the first spectral efficiency value is a baseline spectral efficiency value, and the second spectral efficiency value is the average interference-free spectral efficiency value.

4. The networked computer system of claim 3, wherein the first signal strength ratios are carrier to interference plus noise ratios (CINR), and the second signal strength ratios are signal to noise ratios (SNR).

5. The system of claim 3, wherein the weights applied to calculate the average interference-free spectral efficiency value are a function of the amount of traffic sent to the plurality of user equipment over a time period.

6. The networked computer system of claim 2, wherein the non-transitory computer readable medium with computer executable instructions stored thereon further includes instructions which, when executed by the processor, further cause the processor to perform the following method:

measuring throughput data;
measuring spectral resource usage over the period of time;
converting the spectral resource usage and the throughput into an actual spectral efficiency value for user equipment; and
calculating an average actual spectral efficiency value from the actual spectral efficiency values for user equipment;
wherein the second average spectral efficiency value is the average actual spectral efficiency value.

7. The networked computer system of claim 6, wherein the first user equipment spectral efficiency values are baseline spectral efficiency values.

8. The networked computer system of claim 6, wherein the first user equipment spectral efficiency values are interference-free spectral efficiency values.

9. The system of claim 2, further including determining a calibration function that is then used to calculate the user equipment spectral efficiency values.

10. The system of claim 2, wherein calculating the first average spectral efficiency value further includes:
calculating base station spectral efficiency values for each of a cluster of base stations; and
calculating a cluster spectral efficiency value by averaging the base station spectral efficiency values.

11. The system of claim 1, wherein calculating the first average spectral efficiency value further includes:
arranging the first user equipment spectral efficiency values in order;
selecting a predetermined percentile of the arranged values that is less than fifty percent; and
selecting a spectral efficiency value corresponding to the predetermined percentile,
wherein the selected spectral efficiency value is the first spectral efficiency value.

12. A method for evaluating the performance of a cellular communication network, comprising:
measuring a signal strength value for a signal sent by at least one base station and received by a plurality of user equipment;
calculating first signal strength ratios using the first signal strength value;
converting the first signal strength ratio into first user equipment spectral efficiency values for each user equipment of the plurality of user equipment; and
comparing a first spectral efficiency value corresponding to the first user equipment spectral efficiency values to a second spectral efficiency value to evaluate a data efficiency metric associated with an interference reduction scheme that is running on the base station when the signal strength value is measured.

13. The method of claim 12, further comprising:
calculating the first spectral efficiency value using a weighted average of the first user equipment spectral efficiency values for at least a portion of the plurality of user equipment,
wherein the first spectral efficiency value and the second spectral efficiency value are average values.

14. The method of claim 13, further comprising:
calculating second signal strength ratios using the signal strength value;
converting the second signal strength ratios into user equipment interference-free spectral efficiency values for each user equipment of the plurality of user equipment; and
calculating an average interference-free spectral efficiency value using a weighted average of the user equipment interference-free spectral efficiency values for at least a portion of the plurality of user equipment,
wherein the first average spectral efficiency value is a baseline spectral efficiency value, and the second average spectral efficiency value is the average interference-free spectral efficiency value.

15. The method of claim 14, wherein the first user equipment spectral efficiency values are interference-free spectral efficiency values.

16. The method of claim 13, further comprising:
measuring throughput data;
measuring spectral resource usage over the period of time;
converting the spectral resource usage and the throughput into an actual spectral efficiency value for user equipment; and
calculating an average actual spectral efficiency value from the actual spectral efficiency values for user equipment;
wherein the second average spectral efficiency value is the average actual spectral efficiency value.

17. A non-transitory computer readable medium with computer executable instructions stored thereon which, when executed by the processor, perform the following method:
measuring a signal strength value for a signal sent by at least one base station and received by a plurality of user equipment;
calculating first signal strength ratios using the first signal strength value;
converting the first signal strength ratio into first user equipment spectral efficiency values for each user equipment of the plurality of user equipment; and
comparing a first spectral efficiency value corresponding to the first user equipment spectral efficiency values to a second spectral efficiency value to evaluate a data efficiency metric associated with an interference reduction scheme that is running on the base station when the signal strength value is measured.

18. The computer readable medium of claim 17, wherein the non-volatile computer readable medium with computer executable instructions stored thereon includes additional instructions which, when executed by the processor, further perform:
calculating the first spectral efficiency value using a weighted average of the first user equipment spectral efficiency values for at least a portion of the plurality of user equipment,
wherein the first spectral efficiency value and the second spectral efficiency value are average values.

19. The computer readable medium of claim 18, wherein the non-volatile computer readable medium with computer executable instructions stored thereon includes additional instructions which, when executed by the processor, further perform:
calculating second signal strength ratios using the signal strength value;
converting the second signal strength ratios into user equipment interference-free spectral efficiency values for each user equipment of the plurality of user equipment; and
calculating an average interference-free spectral efficiency value using a weighted average of the user equipment interference-free spectral efficiency values for at least a portion of the plurality of user equipment,
wherein the first average spectral efficiency value is a baseline spectral efficiency value, and the second average spectral efficiency value is the average interference-free spectral efficiency value.

20. The computer readable medium of claim 18, wherein the non-volatile computer readable medium with computer executable instructions stored thereon includes additional instructions which, when executed by the processor, further perform:
   measuring throughput data;
   measuring spectral resource usage over the period of time;
   converting the spectral resource usage and the throughput into an actual spectral efficiency value for user equipment; and
   calculating an average actual spectral efficiency value from the actual spectral efficiency values for user equipment;
   wherein the second average spectral efficiency value is the average actual spectral efficiency value.

* * * * *